J. V. SULTZMAN.
SAW SET.
APPLICATION FILED JUNE 5, 1919.

1,323,656.

Patented Dec. 2, 1919.
3 SHEETS—SHEET 1.

INVENTOR.
J. V. SULTZMAN.
BY Adam E. Fisher
ATTORNEY.

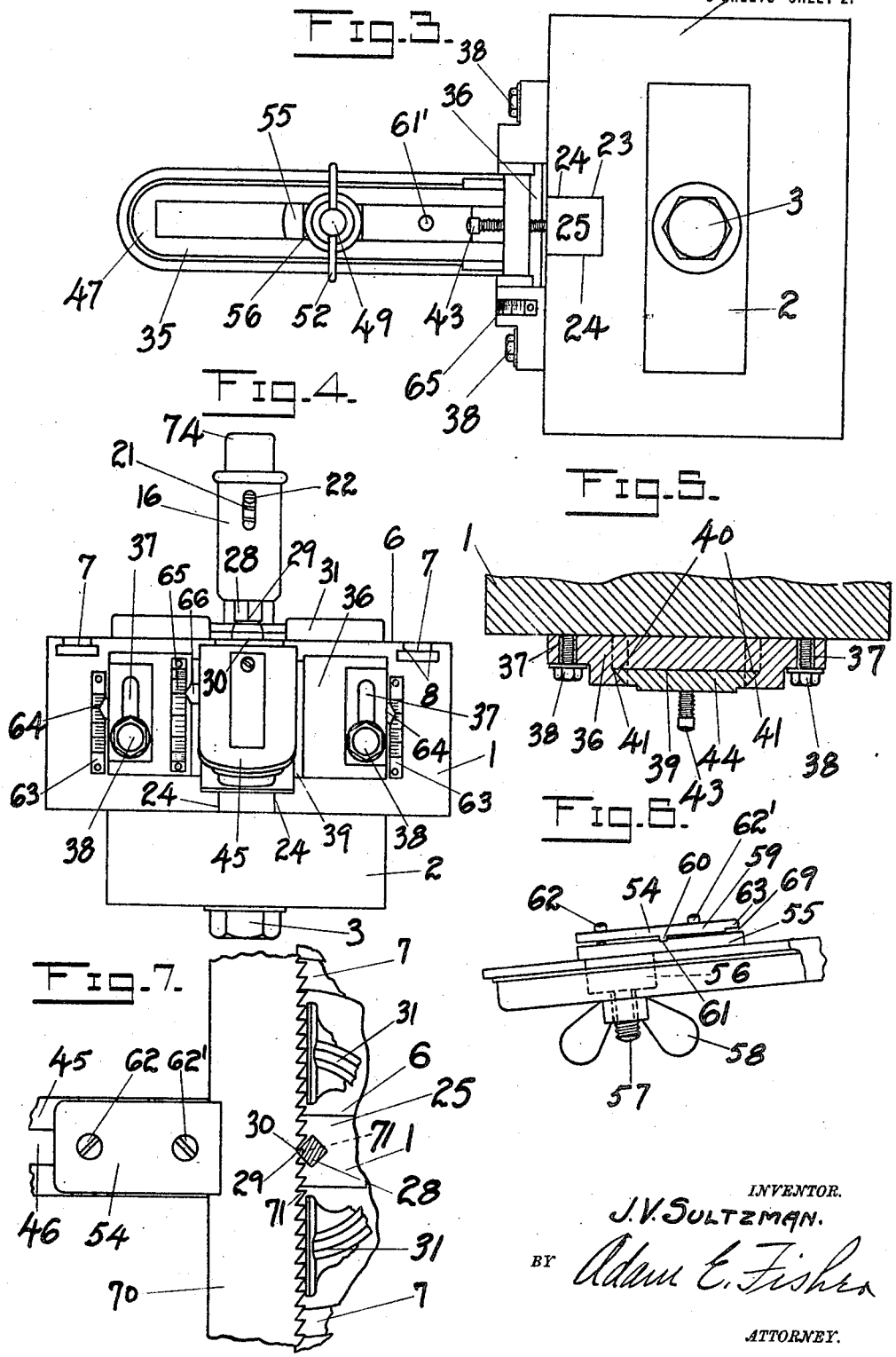

J. V. SULTZMAN.
SAW SET.
APPLICATION FILED JUNE 5, 1919.
1,323,656.
Patented Dec. 2, 1919.
3 SHEETS—SHEET 3.
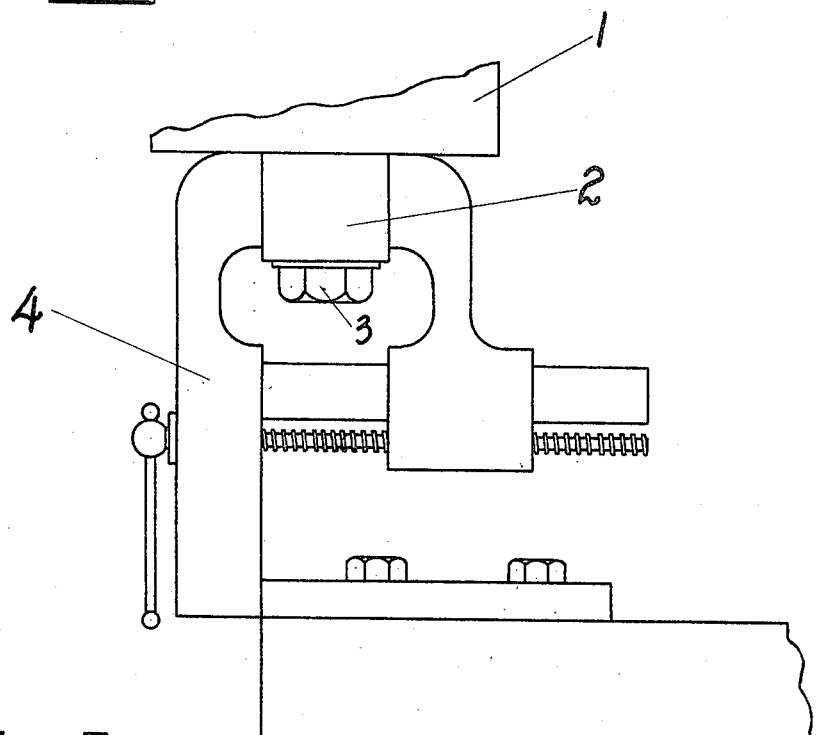
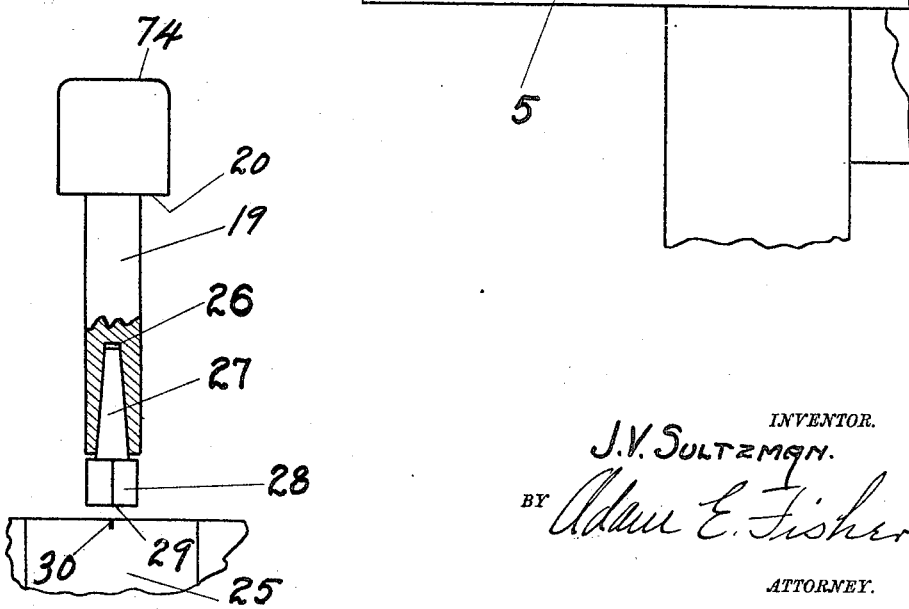
INVENTOR.
J. V. Sultzman.
BY Adam E. Fisher
ATTORNEY.

UNITED STATES PATENT OFFICE.

JOHN V. SULTZMAN, OF HANNIBAL, MISSOURI.

SAW-SET.

1,323,656.     Specification of Letters Patent.     Patented Dec. 2, 1919.

Application filed June 5, 1919. Serial No. 301,929.

*To all whom it may concern:*

Be it known that I, JOHN V. SULTZMAN, a citizen of the United States, residing in the city of Hannibal, county of Marion, and State of Missouri, have invented new and useful Improvements in Saw-Sets, of which the following is a specification, reference being had to the accompanying drawings.

The present invention pertains to saw sets, and the prime object is to provide a combination saw set which may be adjusted for setting the teeth of any kind of saw, such as ordinary hand or carpenters' saws, cross-cut saws, rip saws, band saws, circular saws and the like, and whether said saws have heavy or light blades.

A secondary object is to provide a saw set with adjustable parts which may be readily and quickly arranged for holding any species of saw such as above mentioned while same is being set, and so that the teeth of such saw may be successively passed beneath the die for setting.

A third object is to provide a saw set of this character, which will be simple, practical, strong and durable, and best adapted to fill the requirements of such a tool.

A fourth object is to provide means for readily clamping the saw set into or upon a vise in working position.

With these and other objects in view, attention is called to the accompanying drawings which illustrate a preferred method of construction of my improved saw set, and wherein—

Fig. 3 is a bottom plan view;

Fig. 4 is a frontal view with the saw clamps removed from the saw bracket;

Fig. 5 is a horizontal section of the frontal portion of the swage block, with bearing block attached, showing a method of pivotally mounting the saw bracket to said swage block;

Fig. 6 is a detail showing adjustment of the sliding clamp for supporting a band saw in operable position;

Fig. 7 is a detail showing the positioning of a band saw relative to the swaging die and anvil;

Fig. 8 is a detail showing how the saw-set may be clamped in a vise attached to a bench;

Fig. 9 is a detail showing how the swaging dies may be adjustably mounted in the die-stock.

Figure 1:
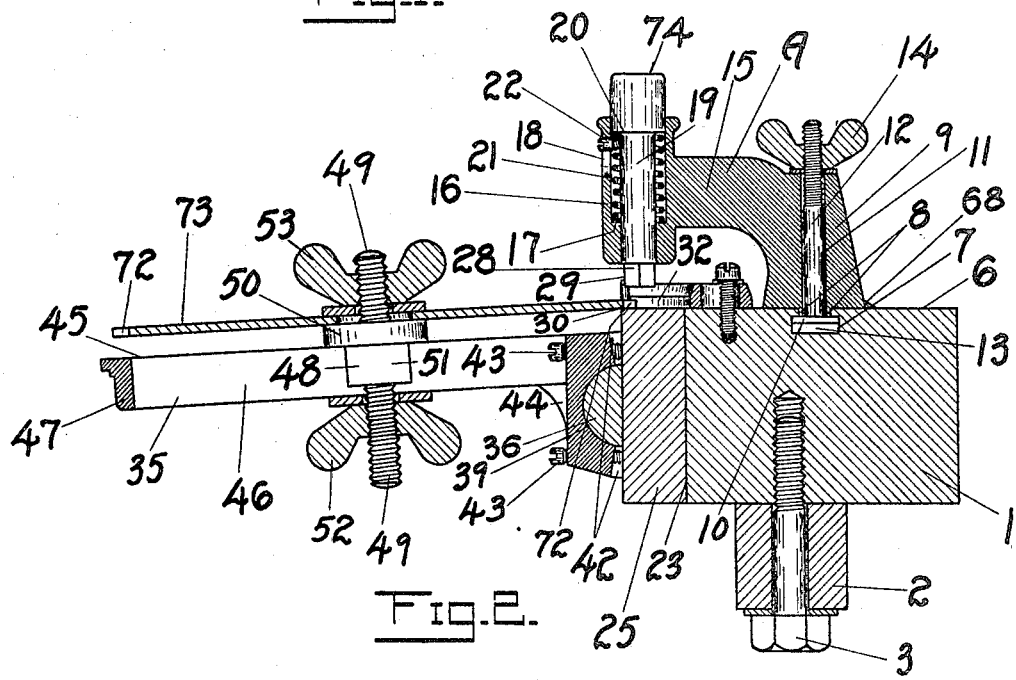
Figure 1 is a longitudinal, vertical section.
Figure 2:
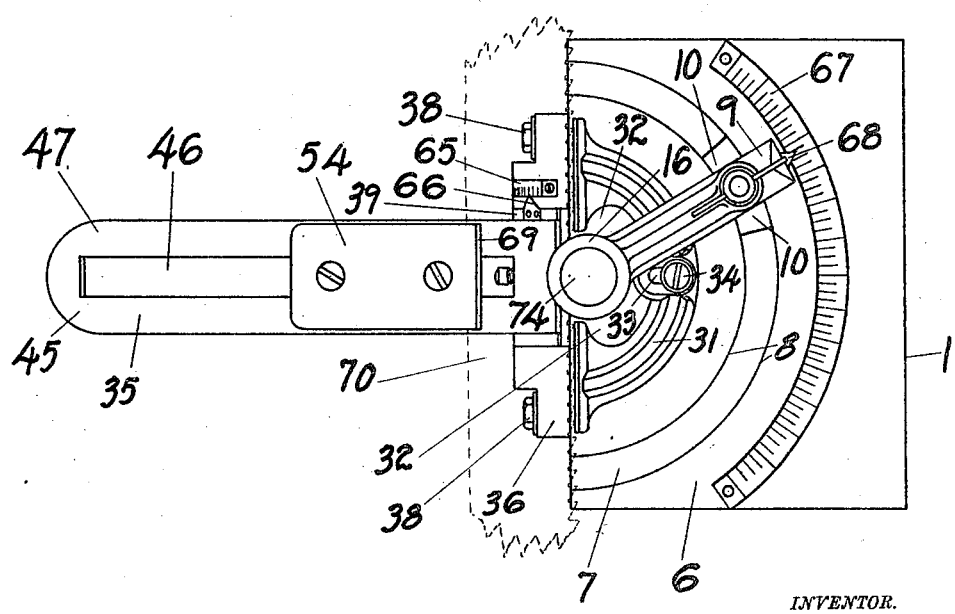
Fig. 2 is a top plan view.

Referring more particularly to the drawings as exemplifying the preferred construction of my invention, I provide a swage block 1, upon the lower side of which is pivoted a vise block 2 by means of a bolt 3 passing vertically through said block, and being anchored in the swage block 1. This vise block 2 may be clamped in any vise as 4, and the latter being secured to the work bench 5, the entire saw set is thus held in firm position for use. Upon the upper face 6 of the swage block 1, I cut a semi-circular guide-way 7, same being mortised out laterally at the bottom thereof, so as to provide the upper retaining flanges 8. Within this guide-way 7, I slidingly mount an arbor A, through its pedestal 9 by means of the lateral lugs 10 projecting down into said guide-way 7, the base of the pedestal having a bearing upon and traveling along the upper surface of the swage block 1. A bolt hole 11 pierces the pedestal 9 through from top to bottom, and a bolt 12 is passed up through this bolt hole and engages the under sides of the flanges 8 by means of the bolt head 13, while a thumb nut 14 at the upper end of the bolt 12 affords means for clamping the pedestal 9 at any point along the guide-way 7 by merely turning said thumb nut. An arm 15 is rigidly mounted on the upper end of the pedestal 9 and extends forwardly, ending in the vertical die-stock socket 16, provided at its lower end with an annular spring support or shoulder 17 and with a screw-slot 18 cut through the wall at the upper end of the socket. The die-stock 19 provided with an upper annular shoulder 20, faced toward and complementary to the shoulder 17, is slidingly mounted in said socket 16, and is normally held in its uppermost position by means of a coil spring 21 encircling the die holder and braced between the shoulders 17 and 20. A screw 22 inserted through the slot 18 into the die-stock 19 holds the said stock within its socket, while at the same time permitting the reciprocating motion of the same. A vertical die-socket 26 may be cut in the lower end of the die-stock 19 adapted to receive the shank 27 of the swaging die 28. Thus, dies of various shapes and sizes may be readily inserted, as required, or the different swaging dies may be formed integral with their stocks and the various stocks substituted in the socket 16, as required. An anvil mortise 23 is cut in the forward vertical face of the swage block 1 at the center thereof in such manner that the sides 24 tend to converge from top to bottom, so that the complementary wedge-shaped anvil 25, cut to conform to said mortise, may be firmly wedged therein, and thus held in place in use. At the same time the anvil 25 may be knocked upward, and thus freed from the mortise when it is desired to replace an old anvil with a new one. The parts aforesaid are so proportioned and positioned that the outer angle 29 of the swaging die 28 falls immediately above the central point 30 of the semi-circular guide-way 7, as the pedestal 9 is shifted back and forth along said guide-way. A semi-circular calibrated plate 67, mounted adjacent the edge of the guide-way 7, co-operates with the pointer 68 projecting from the pedestal 9, and affords means for adjusting the pedestal 9 in the guide-way 7 at any required angle, so that the angle 29 of the die will meet the pitch of the saw-teeth for the proper swaging of said teeth. An adjustable depth gage 31 is provided, having its central portion cut away, so as to leave an opening 32 for the passage of the die 28, and having an adjustment slot 33, through which the set screw 34 passes and engages the swage block 1, thus affording means for locking said gage in any set position.

An adjustable saw-holding bracket 35 is mounted on the forward vertical face of the swage block 1 immediately in front of the anvil 25, and is extended perpendicularly forward, and is adapted for vertical, pivotal motion relative to said swage block 1. The preferred mounting as here shown provides for a horizontal, half-round axial bearing block 36, with adjustment slots 37 cut through the ends thereof, and through which set screws 38 are passed into the swage block 1, whereby the said axial bearing block 36 may be adjusted vertically. Calibrated plates 63 are vertically mounted, one each upon the vertical faces of the swage block 1 adjacent the ends of the axial bearing block 36, and adapted to register with pointers 64 upon the ends of said bearing block as means for horizontally positioning the said bearing block upon the face of the swage block.

A similar half-round bearing surface 39 is formed centrally upon said bearing block, and has lateral, semi-circular, wedge-shaped mortises 40 adapted to receive and hold in place the complementary, semi-circular, wedge-shaped flanges 41, formed at the inner end 44 of said adjustable saw-holding bracket 35. While the mortises 40 form a complete semi-circle, the flanges 41 are cut short of a full semi-circle, so as to leave an arc of space 42, through which said flanges may be pivotally turned upon said bearing surface 39, thus allowing the outer end 47 of the bracket 35 to be raised or lowered. Two set screws 43 are mounted longitudinally through the upper and lower portions of the end 44 of the saw-holding bracket 35, having a threaded engagement therewith, and are adapted to impinge perpendicularly against the vertical face of the anvil 25. Thus the upper face 45 of the saw-holding bracket 35 may be readily adjusted to any required angle of inclination relative to the upper face 6 of the swage block 1, by turning out the upper set screw, and turning in the lower set screw to elevate the saw-holding bracket 35, or vice versa to lower the same; this for the purpose of regulating the degree of set in the saw teeth. A semi-circular calibrated plate 65, mounted upon the axial bearing block, co-operates with a pointer 66 to indicate the required angle of inclination. The saw-holding bracket 35 is provided with a longitudinal, vertical slot 46 extending from the inner end 44 to the outer end 47. Mounted within said slot is a sliding and adjustable disk-like headstock or clamp 48, consisting of a clamping bolt 49, and rigidly mounted thereupon a disk 50, with an elongated lug 51 permanently attached at the lower side of the disk and adapted to slidingly engage the slot 46. The disk 50 moves along the upper face 45, and may be locked in any position along the slot 46 by means of a thumb nut 52 threadedly engaging the bolt 49 at the lower end. A similar thumb nut 53 is mounted upon the upper end of the bolt 49, by means of which a circular saw 73 may be rotatably positioned upon the disk 50. An additional sliding clamp 54 is likewise mounted in the slot 46, same consisting of a lower jaw 55, with an elongated lug 56 permanently joined at the lower side thereof, and adapted to slidingly engage said slot, and the rigidly attached bolt 57 projecting downward through said slot, and having a thumb nut 58 mounted at the lower end of the bolt. An upper jaw 59, provided with a medial transverse rocking rib 60, engages the top of the lower jaw 55 through a medial transverse groove 61, cut in the upper face of said lower jaw. Two set screws 62 and 62' pass through the ends of the upper jaw 59, and engage the lower jaw 55. By this arrangement the forward end 63 of the upper jaw 59 may be adjusted relative to the lower jaw 55 for the purpose of receiving saws of various thicknesses other than circular saws, by merely turning the screws 62 and 62'. For the accommodation of saws of very narrow blades, such as band saws, an additional transverse offset or slot 69 is cut across the forward end of the lower side of the upper jaw 59, so that when said upper jaw is clamped tightly against the lower jaw, said band saw may be passed through this slot, and the teeth properly positioned upon the anvil 25. Likewise, the entire clamp 54 may be locked at any desired position along the slot 46 by turning the thumb nut 58.

In operation, the teeth of various kinds of saws may be set by this tool, as aforesaid. For setting a band saw 70, for instance, the upper jaw 59 is turned down snugly against the lower jaw 55. The sliding clamp 54 is advanced forwardly toward the depth gage 31, so that the teeth of the saw will project over the upper face of the anvil 25 as required for the proper depth of set in the teeth. The sliding clamp 54 is then locked snugly in position as is also the depth gage 31. The pedestal 9 is then so positioned in the guide-way 7 that the outer angle 29 of the die 28 will fall upon the saw tooth 71 which is being set, at the required angle of inclination to correspond to the pitch of the teeth. The width of set in the teeth is regulated by raising or lowering the adjustable saw-holding bracket 35, as above described. A blow with a mallet upon the head 74 of the die-stock 19 will operate to swage the tooth 71 of the saw as required. Thus, the operation is repeated for all of the teeth of the band saw which are swaged to one side, after which the saw is reversed end for end in the clamp 54, the pedestal 9 is moved around the guide-way 7, so that the die 28 will similarly act upon all of the teeth of the saw which are to be swaged to the opposite side. Similarly for setting the teeth of the various kinds of flat saws. For heavy rip saws, or cross-cut saws, the clamp 54 is, of course, moved backward and the jaws 55 and 59 are opened accordingly to receive the blade. For setting circular saws, the clamp 54 is removed from the slot 46, and the circular saw is mounted over and upon the headstock 48 by passing the bolt 49 through the hole at the center of the saw and turning the thumb nut 53 down upon the saw. The headstock is then advanced along the slot, and by properly adjusting the depth gage 31, and the angle of inclination of the saw-holding bracket 35, the teeth of the saw may be successively turned over the anvil 25 for the purpose of setting or swaging same. Likewise, the pedestal 9 is properly adjusted and locked in its guide-way, and the headstock 48 is locked in position by turning up the thumb screws. The teeth 72 of the circular saw are now revolved under the die 28 for the purpose of swaging same to one side, after which the saw is reversed on the headstock, and the tool is adjusted for swaging the teeth to the other side. Similarly, teeth of any kind or character of saw may be properly set by regulating the adjustments as described. If desired, a lever might be mounted in connection with the die holder and used in the operation of the tool instead of a mallet. Different sizes and shapes of swaging dies may, of course, be used, and if preferred, the anvil 25 may be dispensed with, and the swaging done directly upon the upper surface of the swage block. Various other modifications might be employed without departing from the principles of my invention, and while I have herein described a certain specific manner and method of constructing and assembling the elements of my invention, it is understood that I may vary from the same in minor details, not departing from the spirit of my invention, so as best to construct a practical device for the purpose intended, as defined in the appended claims.

What I claim to be new and patentable is:

1. A saw set comprising a swage block; an arbor adjustably mounted thereover with its supporting end adapted to travel in a semicircle while the free end remains at the center; a swaging die reciprocatingly mounted at the free end of said arbor and adapted to impinge perpendicularly upon the swage block so that the frontal angle of the die will approximately coincide with the center of the circle indicated by the semi-circular path of the supporting end of said arbor; and means for holding the saw in operable position.

2. A saw set comprising a swage block; an anvil detachably mounted thereon at its frontal side; a semi-circular guide-way on the upper face thereof and embracing the centrally positioned anvil aforesaid; an arbor adjustably mounted thereover with one end supported from and traveling in said guide-way for adjusting the tool to the pitch of the saw teeth, and the other free end overhanging said anvil; a die-stock socket at the said free end of the arbor; a swaging die reciprocatingly mounted in said socket and means for normally holding same in raised position, said die being adapted to impinge perpendicularly upon said anvil so that the frontal angle of the die will approximately coincide with the center of the circle indicated by said guide-way; a depth gage adjustably mounted on the swage block for regulating the depth of the set of the saw teeth; a saw-holding bracket pivotally mounted at the frontal side of the swage block for regulating the width of the set of the saw teeth; and clamps adjustably mounted on said bracket and adapted to hold various kinds of saws in operable position for swaging the teeth thereof as desired.

3. A saw set comprising a swage block; an anvil detachably mounted thereon at its frontal side; a semi-circular guide-way on the upper face thereof and embracing the centrally positioned anvil aforesaid; an arbor adjustably mounted thereover with one end supported from and traveling in said guide-way for adjusting the tool to the pitch of the saw teeth, and the other free end overhanging said anvil; a die-stock socket at the said free end of the arbor; a swaging die reciprocatingly mounted in said socket and means for normally holding same in raised position, said die being adapted to impinge perpendicularly upon said anvil so that the frontal angle of the die will approximately coincide with the center of the circle indicated by said guide-way; a depth gage adjustably mounted on the swage block for regulating the depth of the set of the saw teeth; a saw-holding bracket pivotally mounted at the frontal side of the swage block for regulating the width of the set of the saw teeth; clamps adjustably mounted on said bracket and adapted to hold various kinds of saws in operable position for swaging the teeth thereof as desired; means for measuring the adjustments of the arbor, depth gage and saw bracket; and means for locking the adjustable elements in any set position.

4. A saw set comprising a swage block; a semi-circular guide-way formed in the top of the swage block; a die holding arbor adjustably mounted in said guide-way and having an arm extended centrally over the frontal side of said swage block and a die-stock socket at its end; a die-stock reciprocatingly mounted in said socket; a swaging die mounted in said die-stock so that its frontal angle is substantially alined with the frontal side of said swage block; a depth gage adjustably mounted on the top of the swage block for regulating the depth of set in the saw teeth; a vertically adjustable, pivotal bearing for a saw-holding bracket mounted on the frontal side of said swage block; a saw-holding bracket pivotally mounted on said bearing; and clamps adjustably mounted on said bracket, for holding various kinds of saws in operable position.

5. A saw set comprising a swage block; a semi-circular guide-way formed in the top of the swage block; a die holding arbor adjustably mounted in said guide-way and having an arm extended centrally over the frontal side of said swage block and a die-stock socket at its end; a die-stock reciprocatingly mounted in said socket; a swaging die mounted in said die-stock so that its frontal angle is substantially alined with the frontal side of said swage block; a saw-holding bracket mounted on the frontal side of said swage block; detachable clamps adjustably mounted in the slot of said bracket, for holding various kinds of saws in operable position; calibrated plates associated with the adjustabe parts aforesaid, as means for adjusting same; and means for locking the adjustable parts aforesaid in any set position.

6. A saw set comprising a swage block; a semi-circular, flanged guide-way in the top of the swage block with the ends of the guide-way substantially flush with the frontal side of the block; an anvil detachably mounted in the swage block centrally of said semi-circular guide-way, with its frontal side substantially on a diametrical line extended between the ends of said semi-circular guide-way; a die holding arbor adjustably mounted in said guide-way and having an arm extended centrally over the frontal side of said swage block and a die-stock socket at its end; a die-stock reciprocatingly mounted in said socket; a vertically adjustable, pivotal bearing for a saw-holding bracket mounted on the frontal side of said swage block; an adjustable saw-holding bracket pivotally mounted on said bearing, said bracket having a longitudinal slot formed therein; detachable clamps adjustably mounted in the slot of said bracket, for holding various kinds of saws in operable position; calibrated plates associated with the adjustable parts aforesaid, as means for adjusting same; a depth gage adjustably mounted on the top of the swage block for regulating the depth of set in the saw teeth; and means for locking the adjustable parts aforesaid in any set position.

7. A saw set comprising a swage block; a semi-circular, flanged guide-way in the top of the swage block with the ends of the guide-way substantially flush with the frontal side of the block; an anvil detachably mounted in the swage block centrally of the guide-way and with its outer side substantially flush with the frontal side of the block; a die holding arbor adjustably mounted in said guide-way and having an arm extended centrally over the frontal side of said swage block and a die-stock socket at its end; a die-stock reciprocatingly mounted in said socket; a swaging die mounted in said die-stock so that its frontal angle is substantially alined with the frontal side of said swage block; an adjustable saw-holding bracket mounted on the frontal side of said swage block; clamps adjustably mounted on said bracket, for holding various kinds of saws in operable position; means for regulating the depth of set in the saw teeth; and means for locking the adjustable parts aforesaid in any set position.

8. A saw set comprising a swage block; a semi-circular, flanged guide-way in the top of the swage block with the ends of the guide-way substantially flush with the frontal side of the block; a die holding arbor adjustably mounted in said guide-way and having an arm extended centrally over the frontal side of said swage block and a die-stock socket at its end; a die-stock reciprocatingly mounted in said socket; a vertically adjustable, pivotal bearing for a saw-holding bracket mounted on the frontal side of said swage block; an adjustable saw-holding bracket pivotally mounted on said bearing, said bracket having a longitudinal slot formed therein; detachable clamps adjustably mounted in the slot of said bracket, for holding various kinds of saws in operable position; a depth gage adjustably mounted on the top of the swage block for regulating the depth of set in the saw teeth; calibrated plates associated with the adjustable parts aforesaid, as means for adjusting same; and means for locking the adjustable parts aforesaid in any set position.

9. A saw set comprising a swage block; a semi-circular, flanged guide-way in the top of the swage block with the ends of the guide-way substantially flush with the frontal side of the block; an anvil detachably mounted in the swage block centrally of the guide-way and with its outer side substantially flush with the frontal side of the block; a die holding arbor slidingly supported at one end in said guide-way and a die-stock socket formed in the other free end over said anvil, said socket having an annular spring supporting shoulder; a die-stock and integrally formed die reciprocatingly mounted through said socket, said die-stock having an annular spring supporting shoulder complementary to the shoulder in said socket; a coil spring expanded between said shoulders around said die-stock for normally holding same in raised position; a saw-holding bracket mounted on the frontal side of said swage block; clamps adjustably mounted on said bracket, for holding various kinds of saws in operable position; a depth gage adjustably mounted on the top of the swage block for regulating the depth of set in the saw teeth; calibrated plates associated with the adjustable parts aforesaid, as means for adjusting same; and means for locking the adjustable parts aforesaid in any set position.

10. A saw set comprising a swage block; a semi-circular guide-way formed in the top of the swage block; an anvil detachably mounted in the swage block centrally of the guide-way and with its outer side substantially flush with the frontal side of the block; a die holding arbor slidingly supported at one end in said guide-way, and a die-stock socket formed in the other free end over said anvil, said socket having an annular spring supporting shoulder; a die-stock and integrally formed die reciprocatingly mounted through said socket, said die-stock having an annular spring supporting shoulder complementary to the shoulder in said socket; a coil spring expanded between said shoulders around said die-stock for normally holding same in raised position; a vertically adjustable, pivotal bearing for a saw-holding bracket mounted on the frontal side of said swage block; a saw-holding bracket pivotally mounted on said bearing; clamps adjustably mounted on said bracket, for holding various kinds of saws in operable position; means for regulating the depth of set in the saw teeth; and means for locking the adjustable parts aforesaid in any set position.

11. A saw set comprising a swage block; a semi-circular guide-way formed in the top of the swage block; an anvil detachably mounted in the swage block centrally of said semi-circular guide-way, with its frontal side substantially on a diametrical line extended between the ends of said semi-circular guide-way; a die holding arbor slidingly supported at one end in said guide-way, and a die-stock socket formed in the other free end over said anvil; a die-stock reciprocatingly mounted in said socket; means for normally holding said die-stock in raised position; a swaging die mounted in said die-stock so that its frontal angle is substantially alined with the frontal side of said anvil; a depth gage adjustably mounted on the top of the swage block for regulating the depth of set in the saw teeth; a vertically adjustable, pivotal bearing for a saw-holding bracket mounted on the frontal side of said swage block; an adjustable saw-holding bracket pivotally mounted on said bearing, said bracket having a longitudinal slot formed therein; detachable clamps adjustably mounted in the slot of said bracket, for holding various kinds of saws in operable position; means for measuring and setting the adjustable parts; and means for locking the adjustable parts aforesaid in any set position.

12. A saw set comprising a swage block; a semi-circular, flanged guide-way in the top of the swage block with the ends of the guide-way substantially flush with the frontal side of the block; an anvil detachably mounted in the swage block centrally of said semi-circular guide-way, with its frontal side substantially on a diametrical line extended between the ends of said semi-circular guide-way; a die holding arbor slidingly supported at one end in said guide-way, and a die-stock socket formed in the other free end over said anvil, said socket having an annular spring supporting shoulder; a die-stock and integrally formed die reciprocatingly mounted through said socket, said die-stock having an annular spring supporting shoulder complementary to the shoulder in said socket; a coil spring expanded between said shoulders around said die-stock for normally holding same in raised position; a depth gage adjustably mounted on the top of the swage block for regulating the depth of set in the saw teeth; a vertically adjustable, pivotal bearing for a saw-holding bracket mounted on the frontal side of said swage block; an adjustable saw-holding bracket mounted on the frontal side of said swage block; clamps adjustably mounted on said bracket, for holding various kinds of saws in operable position; calibrated plates associated with the adjustable parts aforesaid, as means for adjusting same; and means for locking the adjustable parts aforesaid in any set position.

JOHN V. SULTZMAN.

Witnesses:
HARRISON WHITE,
CHARLES E. RENDLEW.